(12) United States Patent
Wolford (10) Patent No.: US 11,092,669 B1
(45) Date of Patent: Aug. 17, 2021

(54) GROUND CLUTTER FILTER AND METHOD FOR DETECT AND AVOID SENSING

(71) Applicant: Rockwell Collins, Inc., Cedar Rapids, IA (US)

(72) Inventor: Brian R. Wolford, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 288 days.

(21) Appl. No.: 15/952,032

(22) Filed: Apr. 12, 2018

(51) Int. Cl.
*G01S 7/41* (2006.01)
*G01S 7/295* (2006.01)

(52) U.S. Cl.
CPC .............. *G01S 7/414* (2013.01); *G01S 7/295* (2013.01)

(58) Field of Classification Search
CPC ........ G01S 7/414; G01S 7/487; G01S 7/4876; G01S 13/5242–13/5265; G01S 13/88; G01S 13/89; G01S 13/90
See application file for complete search history.

(56) References Cited

U.S. PATENT DOCUMENTS

| 4,914,734 | A | * | 4/1990 | Love | G01C 21/005 |
| | | | | | 342/53 |
| 5,424,742 | A | * | 6/1995 | Long | G01C 21/005 |
| | | | | | 342/25 C |
| 5,654,890 | A | * | 8/1997 | Nicosia | G01C 21/165 |
| | | | | | 701/16 |
| 6,526,352 | B1 | * | 2/2003 | Breed | G01S 19/48 |
| | | | | | 701/470 |
| 6,832,156 | B2 | * | 12/2004 | Farmer | G01S 7/41 |
| | | | | | 701/301 |
| 10,311,752 | B2 | * | 6/2019 | Elgersma | G06T 17/00 |
| 2004/0243299 | A1 | * | 12/2004 | Scaer | G08G 1/202 |
| | | | | | 701/522 |
| 2008/0111731 | A1 | * | 5/2008 | Hubbard | G01S 13/872 |
| | | | | | 342/160 |
| 2009/0210388 | A1 | * | 8/2009 | Elson | G06F 16/29 |
| 2010/0063730 | A1 | * | 3/2010 | Case | G01S 7/414 |
| | | | | | 701/414 |
| 2012/0256781 | A1 | * | 10/2012 | Vacanti | G01S 7/354 |
| | | | | | 342/120 |
| 2013/0201054 | A1 | * | 8/2013 | Wang | G01S 13/04 |
| | | | | | 342/93 |
| 2014/0240167 | A1 | * | 8/2014 | Cho | G08G 1/052 |
| | | | | | 342/104 |
| 2016/0061945 | A1 | * | 3/2016 | Minowa | G01S 13/95 |
| | | | | | 342/26 R |
| 2016/0061946 | A1 | * | 3/2016 | Wallace | G01S 13/5244 |
| | | | | | 342/161 |
| 2016/0124084 | A1 | * | 5/2016 | Lim | G01S 7/354 |
| | | | | | 342/160 |
| 2017/0031013 | A1 | * | 2/2017 | Halbert | G01S 7/414 |
| 2018/0172821 | A1 | * | 6/2018 | Apker | G01S 13/89 |
| 2019/0101622 | A1 | * | 4/2019 | Wilson | G01S 13/93 |
| 2020/0025901 | A1 | * | 1/2020 | Corretja | G01S 13/526 |

* cited by examiner

*Primary Examiner* — Peter M Bythrow
(74) *Attorney, Agent, or Firm* — Suiter Swantz pc llo (57) ABSTRACT

A method using a radar system includes providing a radar pulse using an antenna, receiving radar returns using the antenna, and detecting target data using the radar returns. The target data is processed using ground data associated with transportation routes. Correlation of a transportation route of the transportation routes and a location of a first target associated with the target data is an indication of ground clutter.

11 Claims, 7 Drawing Sheets

GROUND CLUTTER FILTER AND METHOD FOR DETECT AND AVOID SENSING

BACKGROUND

The inventive concepts disclosed herein relate generally to the field of avionics systems. More particularly, embodiments of the inventive concepts disclosed herein relate to systems and methods for reducing ground clutter when using a sensing system including but not limited to a radar system.

An unmanned aerial system (UAS) is a remotely piloted or autonomous aircraft or other vehicle that travels above ground level. The UAS can carry cameras, sensors, communications equipment, or other payloads. The UAS can be used for various missions, including but not limited to surveillance, reconnaissance, target acquisition, data acquisition, communications relay, decoy, harassment, natural disaster relief, weather observation, or supply flights.

The UAS and other aircraft use ground based radar systems, air based radar systems, or other active sensors to sense targets, such as, other aircraft in the vicinity of the UAS. The UAS as well as other aircraft can include a detect and avoid (DAA)/due regard (DR) capability that provides warnings or adjusts the flight path of the UAS or aircraft in response to the detected targets. Ground clutter can affect the appropriate sensing of targets by the radar system or other sensor.

SUMMARY

In one aspect, the inventive concepts disclosed herein are directed to a method using a radar system. The method includes providing a radar pulse using an antenna, receiving radar returns using the antenna, and detecting target data using the radar returns. The target data is processed using ground data associated with transportation routes. Correlation of a transportation route of the transportation routes and a location of a first target associated with the target data is an indication of potential ground clutter.

In a further aspect, the inventive concepts disclosed herein are directed to a radar system for an unmanned aviation system (UAS). The radar system includes an antenna, and a circuit configured to receive radar return data associated with radar returns received on the radar antenna. The circuit is configured to detect a plurality of targets using the radar return data and filter out ground clutter in the radar return data using transportation route data.

In a further aspect, the inventive concepts disclosed herein are directed a sensing system with ground clutter rejection. The sensing system includes a processor configured to scan a volume of space for targets in the volume of space using electromagnetic energy data. The processor is configured to receive transportation route data and remove targets traveling along a ground transportation route of the ground transportation route data.

Alternative examples and other exemplary embodiments relate to other features and combination of features as may be generally recited in the claims.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting. Unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

In some embodiments, systems and methods can be utilized with sensors associated with unmanned aerial systems or a UAS as well as manned aircraft. The systems and methods can be used to filter or reduce ground clutter associated with the sensing of targets. The sensed targets can be used by a detect and avoid/due regard radar capability that allows detection of non-cooperative airborne targets within civil air space.

In some embodiments, the systems and methods of reducing ground clutter allow a UAS to fly in the national airspace system (NAS) by bringing compliance with Detect and Avoid (DAA) requirements. When the UAS flies in low altitude areas, per Federal Aviation Authority (FAA) mandates, the radar must contend with extensive ground clutter. Conventional radar systems are susceptible to clutter in the signal due to the proximity to the ground associated with the low altitude. The clutter in the signal can cause false positive data (sensing airborne or other targets where none exits). To limit false positive data, some embodiments of the systems and methods disclosed herein combine ground transport database data from available sources (i.e. USGS National Transportation Dataset (NTD)) with sensor data to bring in clutter rejection zones or "routes". Targets acquired traversing these known routes are filtered or decluttered off the radar display and radar data because the targets are travelling along known ground transportation routes, along known tracks. The removal of these targets reduces false data entering into the detect and avoid data stream and reduces pilot confusion in some embodiments.

Systems and methods advantageously provide ground cutter rejection for active sensor systems such as systems using electromagnetic signals to sense the presence of targets (radar systems) in some embodiments. In some embodiments, a ground based or airborne radar system with ground clutter rejection can be utilized with non-manned or manned aircraft in some embodiments. In some embodiments, the radar system uses simultaneous multiple scans and utilizes an active electronically scanned array antenna.

The term due regard/detect and avoid radar as used in this disclosure refers to radar that performs a due regard function, a detect and avoid function, or both a due regard function and a detect and avoid function. The term is intended to encompass both a due regard radar systems and detect and avoid radar systems as individual systems or as combined systems.

Figure 1:
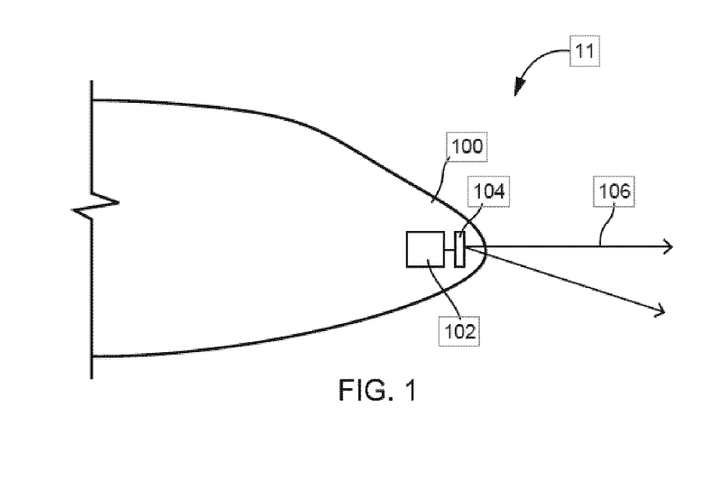
FIG. 1 is a partial side view schematic illustration of an aircraft including a sensing system according to a certain exemplary inventive concepts.

Referring to FIG. 1, a partial illustration of an aircraft 11 is shown. The aircraft 11 is a manned or unmanned vehicle in one or more embodiments. The aircraft 11 and/or a remote station can include a display that may be configured to show weather, terrain, fixed obstacles, variable obstacles (e.g., other aircraft), flight characteristics (e.g., altitude or speed), or any combination thereof sensed by a sensing system onboard aircraft 11 or remote from the aircraft 11. The sensing system is a radar system 102 in some embodiments.

In some embodiments, the aircraft 11 is a UAS used for reconnaissance, surveillance and target acquisition (RSTA) missions. For example, the UAS can launch and execute a mission by flying to one or more waypoints according to a flight plan before arriving at a landing position. Once launched, the UAS performs the flight plan autonomously or with varying degrees of remote operator guidance from one or more ground control stations. The UAS can include one or more active or passive sensors that operate with in conjunction with land based active or passive sensors. The sensors can include a radar system, an infrared sensor, a millimeter wave sensor, an electro-optical (EO) sensor, a non-visible-light sensor (e.g. infrared (IR) sensors), an EO/IR sensor, a video camera or other sensor for sensing targets. In some embodiments, additional sensors, such as motion sensors, heat sensors, wind sensors, vibrations sensors, and/or acoustic sensors, can be utilized with the UAS. Different types of sensors may be used depending on the characteristics of the intended UAS mission and the environment in which the UAS is expected to operate.

The radar system 102 is generally located inside a nose of the aircraft 11 or is a land based radar system. The land based radar system can be in communication with a ground station for remotely controlling the aircraft 11 in some embodiments. The radar system 102 can be used on other vehicles (e.g., ordinance, missiles, drones, naval vehicles or terrestrial vehicles) besides aircraft in some embodiments. According to some embodiments, the radar system 102 may be located at the top of the aircraft 11, on the bottom of the aircraft 11, on the tail of the aircraft 11, or distributed on multiple portions of the aircraft 11. In an exemplary embodiment, the radar system 102 can be a radar system that is adapted to sense weather phenomena and detect other aircraft in the vicinity of the aircraft 11.

The radar system 102 can include or be coupled with a radar antenna 104. The radar antenna 104 is a relatively small antenna in some embodiments. In some embodiments, the radar antenna 104 is an active electronically scanned array antenna or an active phase antenna. In some embodiments, the radar antenna 104 is suitable for smaller aircraft, business and regional systems (BRS) aircraft or unmanned vehicles (e.g., the radar antenna 104 can have an 18 inch diameter or less).

Advantageously, the radar system 102 can be utilized to sense a variety of targets and/or weather phenomenon, including but not limited to precipitation, wind shear, convective cells and other hazards, and aircraft targets using the radar antenna 104. In some embodiments, the radar system 102 is only capable of detecting or sensing targets for collisions avoidance. An electronic or mechanical steering mechanism or combination thereof can be used to steer the radar antenna 104 according to azimuth angles and tilt angles. In some embodiments, the radar system 102 is capable of providing transmit pulses (electromagnetic energy) with independent beam shapes and beam directions during a radar scan 106. In some embodiments, the radar antenna 104 provides a set of pulses, beams or sub-beams. The set of pulses can be provided simultaneously or near simultaneously or sequentially in some embodiments.

The radar system 102 can use signal encoding techniques to differentiate returns from each independent pulse during the radar scan 106 in one embodiment. Robust target editing techniques are used on the returns to remove side lobe targets and ground targets to reduce false alarms in one or more embodiments. Target editing can be an angle based processes that are similar to in-range editing processes that are done for high spectral targets (e.g. spectral width editing for ground moving targets or moving propellers/turbines in a single range resolution cell) in some embodiments. In some embodiments, target editing is used to filter or remove ground targets by identifying targets traveling along known transportation routes or at known ground movement locations.

In some embodiments, the radar system 102 provides the set of pulses and receives returns using an active electronically scanned array antenna as the radar antenna 104. The radar antenna 104 can include an array of individual steerable elements in some embodiments. The elements can be coupled to solid state transmit/receive modules. The transmit/receive modules can provide signals at different frequencies or with different coding in some embodiments. Beams can be aimed from the radar antenna 104 by emitting separate radio waves from each element that interfere constructively at certain angles in front of the radar antenna 104 in some embodiments. The radar antenna 104 can be steered by using phase delay circuits or time delay circuits in one or more embodiments.

The radar antenna 104 can include various components including apertures, power amplifiers, phase shifters, time delay circuits, transmit/receive switches, temperature sensing equipment, multiplexers, radio frequency power amplifiers, and phase sensing components in some embodiments. In some embodiments, a two dimensional array of the radar antenna 104 for the radar system 102 can be circular, cylindrical, spherical, etc., and can be an arbitrarily curved surface and can be conformal to a vehicle surface (e.g. the aircraft 11).

Figure 2:
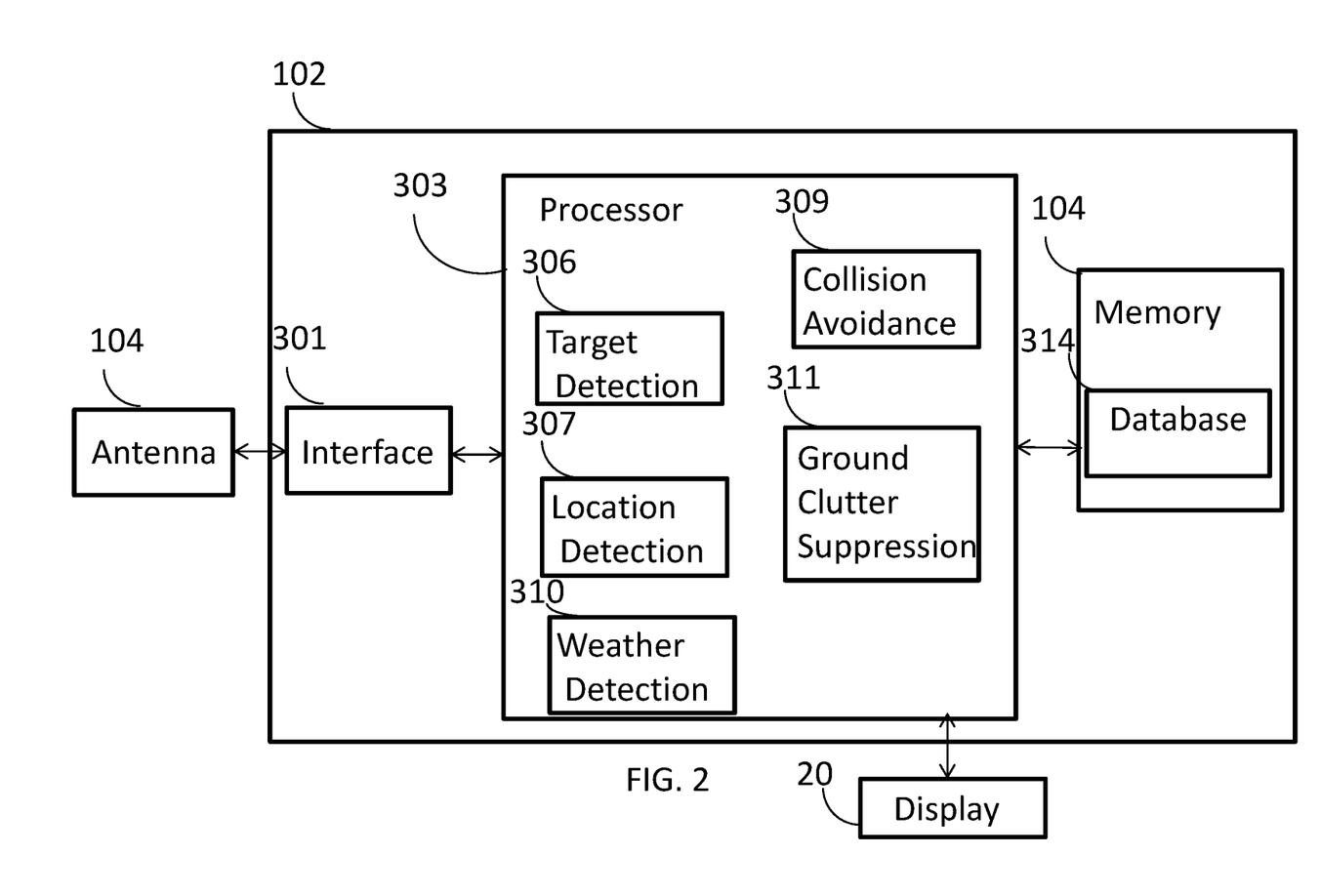
FIG. 2 is a general block diagram of the sensing system illustrated in FIG. 1 according to a certain exemplary inventive concepts.

Referring to FIG. 2, the radar system 102 includes a processor 303, a memory 305, and a transmit/receive interface circuit 301 in one or more embodiment. An optional display 20 can be provided. In some embodiments, the radar system 102 and the processor 303 are part of or integrated with a navigation system for the aircraft 11.

In some embodiments, the processor 303 controls the radar antenna 104 via the transmit/receive interface circuit 301 to provide electromagnetic energy (e.g., radar pulses) for the sensing functions using the radar antenna 104. Although the radar system 102 is discussed below as an avionic radar system, the radar system 102 can also by a ground-based or naval based radar system. The processor 303 includes a target detection module 306, a location module 307, a collision avoidance module 309, a weather module 310 and a ground clutter suppression module 311. The processor 303 processes radar data associated with radar returns from the transmit/receive interface circuit 301 to detect the presence and location (e.g., altitude, latitude, longitude, or relative location to the aircraft 11) using the target detection module 306. The presence and the location of the targets is provided on the display 20. The processor 303 determines the location of the targets using the location of the aircraft 11 as determined by the location module 307 in some embodiments. The location module 307 is a GPS-based unit or inertial reference system in some embodiments.

The processor 303 filters or declutters the targets by identifying the targets that are likely due to ground targets using the ground clutter suppression module 311. For example, targets that are ground vehicles are identified by a location of a target being coincident with the a transportation route. The location of the aircraft 11 as determined by the location module 307 is used by the ground clutter suppression module to determine the location of the target in an altitude, latitude and longitude format or other format compatible for comparison with stored transportation routes.

Further verification of the target for removal can be achieved by determining that the altitude of the target is close to ground. For example, if the target has an altitude below a threshold (e.g., 50 feet above ground level at the target location or less) and is located at the location of a transportation route, the target is considered a ground vehicle and is removed from the target data provided to the collision avoidance module 309 and not provided on the display 20 in some embodiments. Further or other verification of the target for removal can be achieved by determining the velocity of the target using Doppler data. For example, if the velocity is below a threshold (e.g., 60 miles per hour) and the target is located at the location of a transportation route, the target is considered a ground vehicle and is removed from the target data provided to the collision avoidance module 309 and not provided on the display 20 in some embodiments. Further or other verification of the target for removal can be achieved by determining the velocity (e.g., direction of travel) of the target using Doppler data or historical data. For example, if the direction of travel is along the route, the target is considered a ground vehicle and is removed from the target data provided to the collision avoidance module 309 and not provided on the display 20 in some embodiments. A combination of the verification techniques discussed above can be utilized by the ground clutter suppression module 311 to verify that a target is a ground target that should be removed in some embodiments.

In some embodiments, targets that are associated with known locations of wind turbines or other ground infrastructure with moving components can be identified using obstacle location data. Such targets can be identified as fixed obstacles as opposed to moving targets by the ground clutter suppression module 311 in some embodiments.

The targets remaining in the data are provided to the collision avoidance module 309 and the weather module 310 for respective collision avoidance and weather detection operations. The collision avoidance module 309 can cause the aircraft to maneuver to avoid the targets in the data and/or provide warnings to the pilot or operator. The collision avoidance module 309 can be for due regard/detect and avoid circuit or module. In some embodiments, the targets identified as ground clutter can be provided on the display 20 but are marked as ground clutter via an icon, text or other indicator.

In some embodiments, the transmit/receive interface circuit 301 provides hardware components for processing radar (e.g., radio frequency) signals for target sensing functions. Data associated with radar returns received by the radar antenna 104 are provided to the processor 303 from the transmit/receive interface circuit 301 in some embodiments. The processor 303 receives data associated with radar for due regard/detect and avoid capability and processes the data for obstacle (e.g., other aircraft) detection in one or more embodiments. The processor 303 can include a due regard/detect and avoid module 310 for providing the due regard/detect and avoid capability.

The memory 305 can store the data associated with the radar returns and software for weather detection and target detection executed on the processor 303. The modules 306, 307, 309, 310 and 311 are circuits, software or combinations thereof stored in the memory 305 in some embodiments.

The memory 305 includes a data base 314. In some embodiments, the data base 314 is a geographic data base including the locations of transportation routes, such as, roads. The latitude, longitude, and altitude of transportation routes or zones can be provided by the data base 314. In addition, the data base can provide the directions of travel associate with the transportation routes. The data base 314 is a USGS national transportation database in some embodiments. In some embodiments, the database 314 can include traffic data (e.g., be updated with real time traffic data) and the traffic data is utilized by the ground clutter suppression module 311 to verify targets that are moving along the ground. In some embodiments, the database is a worldwide or countrywide data base or is a smaller data base including locations of transportation routes in the vicinity of the aircraft 11. In some embodiments, the processor 303 is in communication with a larger land-base or internet base database and receives downloads of transportation route information associated with the vicinity of the aircraft 11.

The processor 303 and transmit/receive interface circuit 301 can be embodied by a hardware platform similar to the MULTISCAN™ hardware platform manufactured by Rockwell Collins, Inc. or other target detection hardware platform configured as described herein. In some embodiments, the radar system 102 can be combined or integrated with other aircraft systems. The processor 303 and the memory 305 can also be coupled to additional sensors and other input devices or be part of other systems. The memory 305 can contain static and/or dynamic data, including the UAV's flight plan, flight corridors, flight paths, terrain maps, and other navigational information for use by the collision avoidance module 309. The memory 305 may also contain program instructions, executable by the processor, to conduct flight operations, and other operations, in accordance with the methods disclosed herein.

The transmit/receive interface circuit 301 is used to provide steering control signals and radar signals to the radar antenna 104 in one or more embodiments. The steering control signals and radar signals can cause the radar antenna 104 to simultaneously or near simultaneously provide radar pulses or beams. The radar pulses or beams are configured for weather sensing or obstacle sensing in one or more embodiments. Radar returns associated with the radar pulses or beams are received by the radar antenna 104. The radar pulses are X-band or C-band radar signals and the radar returns are in the X-band and C-band in some embodiments.

Figure 3:
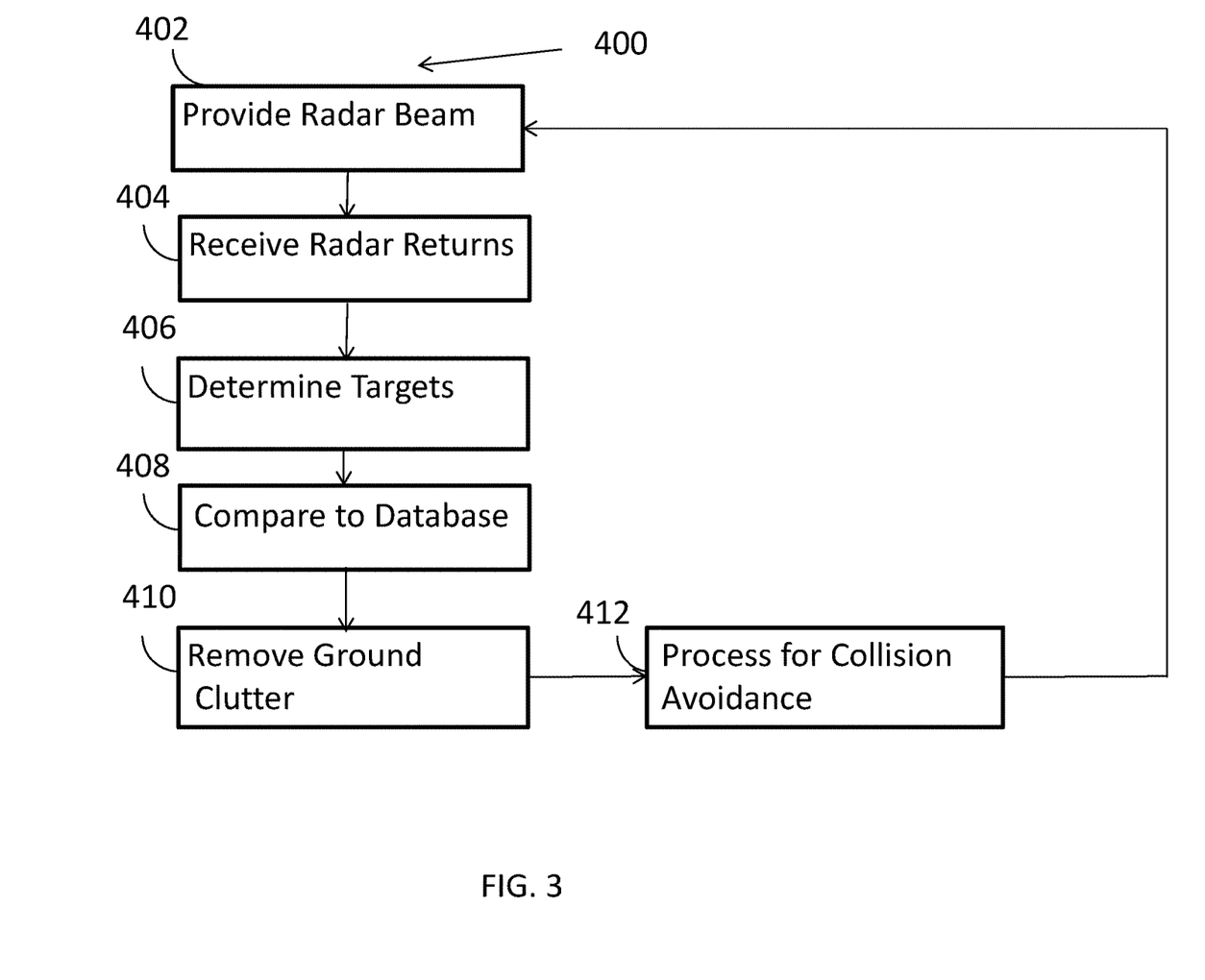
FIG. 3 is a flow diagram showing an exemplary embodiment of an operation of the sensing system illustrated in FIG. 1 according to a certain exemplary inventive concepts.

With reference to FIG. 3, the radar system 102 (FIG. 1) or a navigation system can operate according to a flow diagram 400 in some embodiments. At an operation 402, radar beams are provided. The radar beams can be provided across an azimuth scan in one embodiment. At an operation 404, radar returns are received. At an operation 406, radar returns are processed to determine the presence and location of targets. At an operation 408, the locations of the targets are compared to transportation route data. Various factors can be used to compare the target location and transportation route data. Historical target data (e.g., target data over time) and Doppler data can be used to determine velocity and direction of travel to determine if the target is ground target traveling along a transportation route.

At an operation 410, the ground targets traveling along a transportation route are removed from the target data. Various factors can be used filter out the ground targets traveling along a transportation route in the detect and avoid data stream including but not limited to target editing. Removing the ground targets also prevents those targets from being displayed, thereby removing display clutter. At an operation 412, the filtered target data is used for collision detection (e.g., due regard/detect and avoidance operations). The data associated with radar returns are also used for weather detection in some embodiments. After or during operation 412, the flow returns to operation 402 in some embodiments. Operations 406-412 can be performed while operations 402 and 404 are performed.

Figure 4:
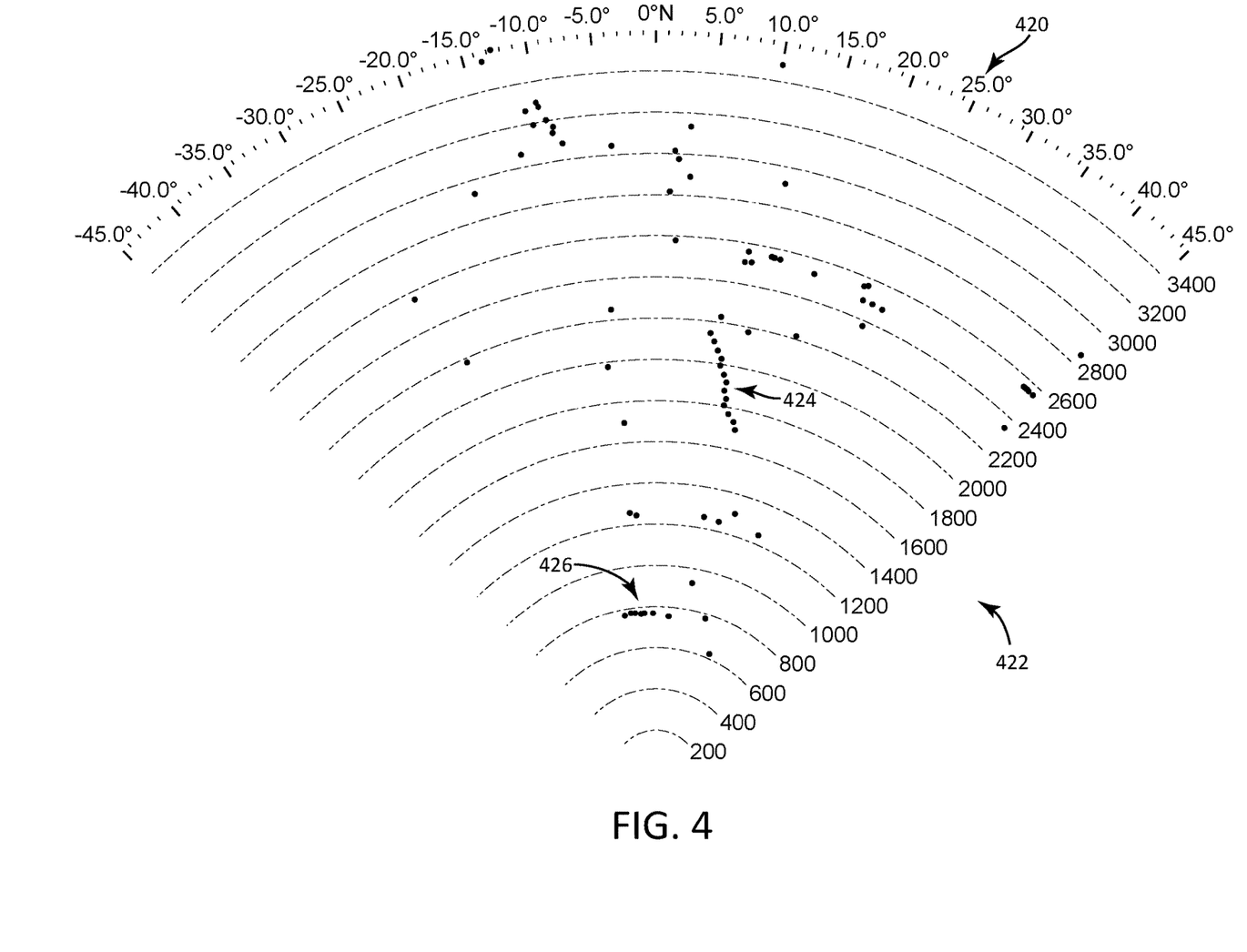
FIG. 4 is a schematic drawing of display for the sensing system illustrated in FIG. 1, showing ground clutter caused by ground vehicles along a ground transportation route according to a certain exemplary inventive concepts.

With reference to FIG. 4, a radar display 420 having range lines 422 across an azimuth range is shown on the display 20 (FIG. 1). The radar display 420 shows targets derived from radar returns at a first time shown as dots. A set of targets 424 are air targets while a set of targets 426 are road or car targets. The set of targets 426 can be removed from the radar display 420 and the target data by the ground clutter suppression module 311 (FIG. 2) in some embodiments. The set of targets 426 can be identified by the correspondence of a ground route and the set of targets 426.

Figure 5:
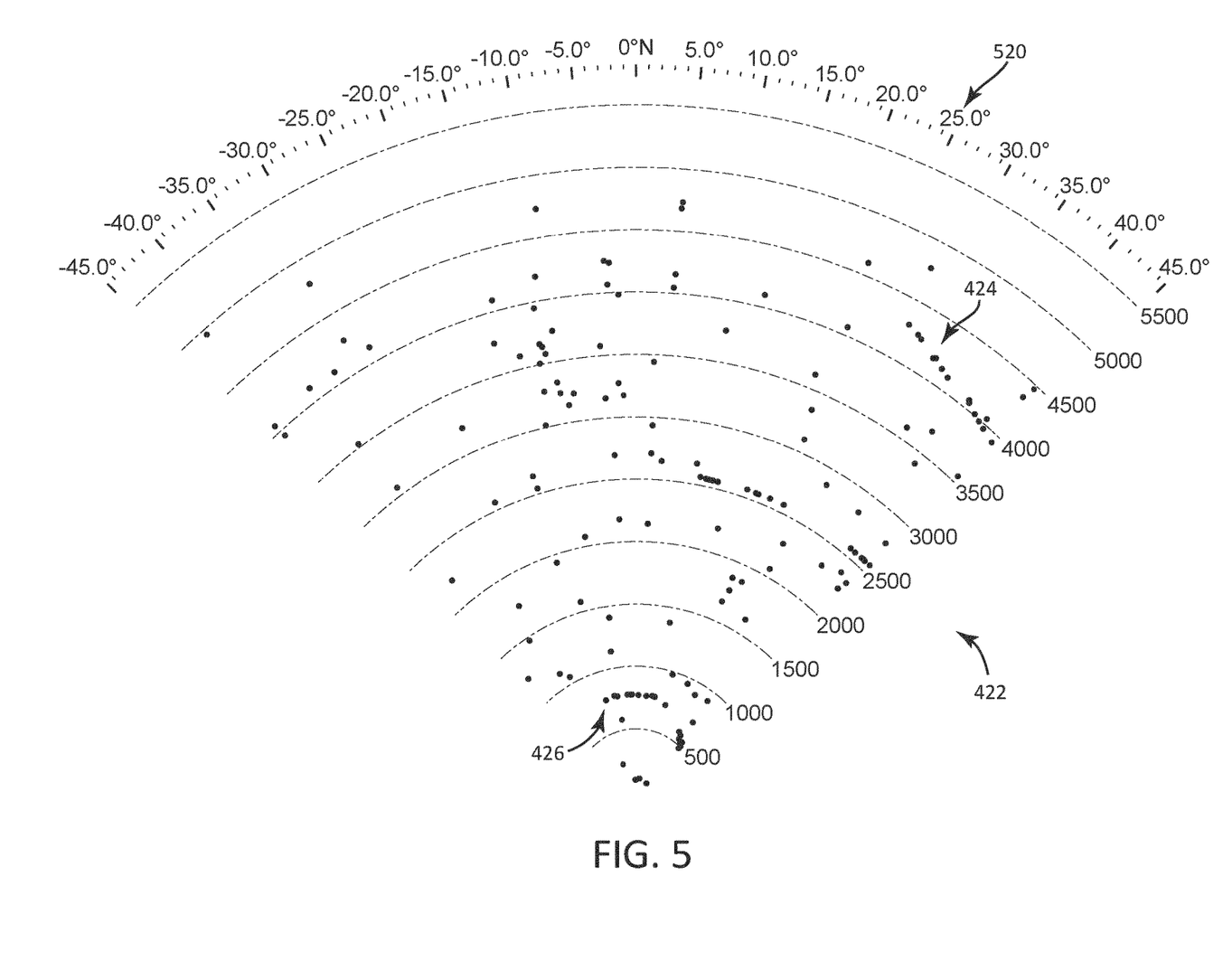
FIG. 5 is a schematic drawing of display for the sensing system illustrated in FIG. 1, showing ground clutter caused by vehicles along a ground transportation route according to a certain exemplary inventive concepts.

With reference to FIG. 5, a radar display 520 is similar to the radar display 420 and shows targets derived from radar returns at a second time. The set of targets 424 are air targets while a set of targets 426 are road or car targets. The set of targets 426 have not drastically moved between the first time and the second time and appear to remain along a transportation route indicating that the set of targets 426 are road or car targets. The set of targets 426 can be identified by the correspondence of a ground route and the set of targets 426. In contrast, the set of targets 424 have moved significantly and not along a transportation route. In addition, traffic data can be used to confirm the set of targets 426 are consistent with density and numbers along the transportation route in some embodiments.

Figure 6:
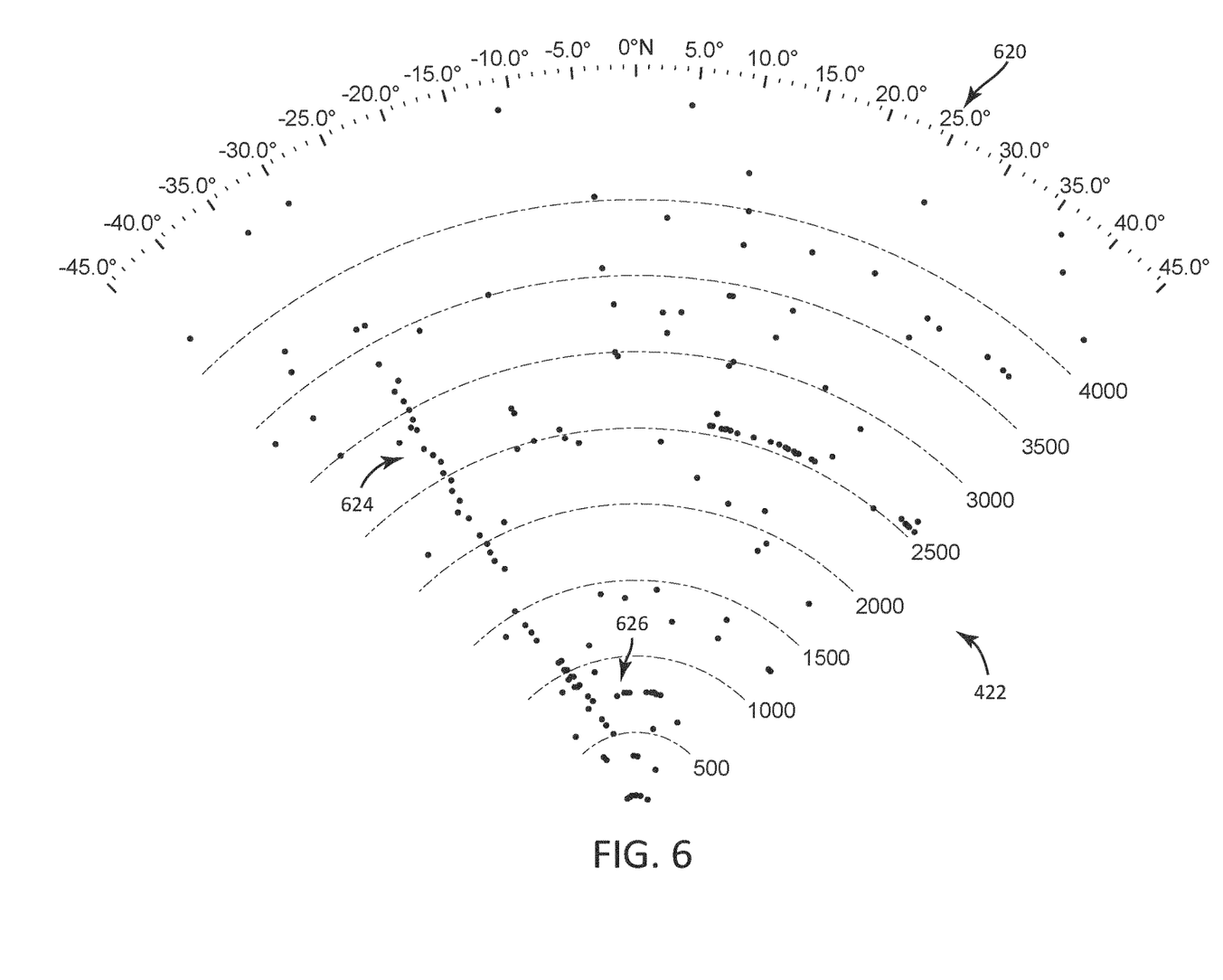
FIG. 6 is a schematic drawing of display for the sensing system illustrated in FIG. 1, showing ground clutter caused by ground vehicles along a ground transportation route according to a certain exemplary inventive concepts.

With reference to FIG. 6, a radar display 620 having range lines 422 across an azimuth range is shown on the display 20 (FIG. 1). A set of targets 624 are air targets while a set of targets 626 are road or car targets. Even though the set of targets 624 appear to be distributed in a line, the locations of the targets do not correspond to a transportation route and therefore are considered air targets. The set of targets 626 can be removed from the radar display 420 and the target data by the ground clutter suppression module 311 in some embodiments. The set of targets 626 can be identified by the correspondence of a ground route and the set of targets 626.

Figure 7:
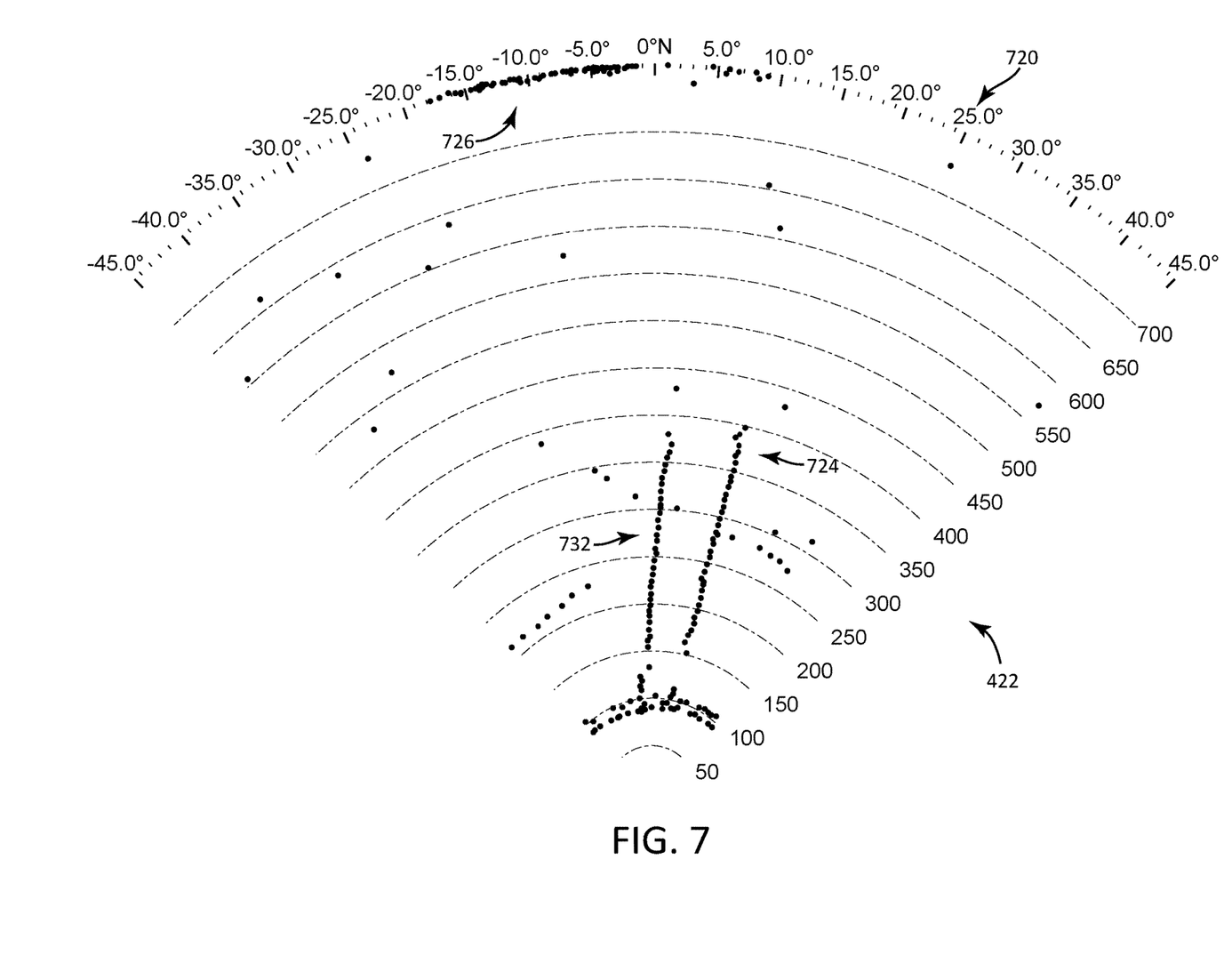
FIG. 7 is a schematic drawing of display for the sensing system illustrated in FIG. 1, showing ground clutter caused by vehicles along a ground transportation route according to a certain exemplary inventive concepts.

With reference to FIG. 7, a radar display 720 having range lines 422 across an azimuth range is shown on the display 20 (FIG. 1). A set of targets 724 are air targets while a set of targets 726 are road or car targets. Even though the set of targets 724 appear to be distributed in a line, the location of the set of targets 724 does not correspond to a transportation route and therefore those targets are considered air targets. The set of targets 726 can be removed from the radar display 720 and the target data by the ground clutter suppression module 311 in some embodiments. The set of targets 726 can be identified by the correspondence of a ground route and the set of targets 726. A set of targets 732 are birds. The set of targets 732 can be confirmed to be non-ground targets based upon their location and path of travel outside of transportation routes.

While the detailed drawings, specific examples and particular formulations given describe preferred and exemplary embodiments, they serve the purpose of illustration only. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A radar system for an unmanned aviation system (UAS), the radar system comprising:
    an antenna; and
    a circuit configured to receive radar return data associated with radar returns received on the antenna, the circuit being configured to detect a plurality of targets using the radar return data and filter out ground clutter in the radar return data using transportation route data.

2. The radar system of claim 1, wherein the targets are provided to a due regard/detect and avoid module.

3. The radar system of claim 1, wherein the targets are provided to a weather radar module.

4. The radar system of claim 1, wherein the ground clutter is identified by comparing a location and direction of travel to the transportation route data.

5. The radar system of claim 1, wherein the ground clutter is identified by comparing a location, altitude, and direction of travel to the transportation route data.

6. The radar system of claim 5, further comprising:
    a display, wherein the display provides indications of the targets and an indication of the ground clutter.

7. The radar system of claim 1, wherein the transportation route data is provided from a United States Geological Society (USGS) national transportation database.

8. A sensing system with ground clutter rejection, the sensing system comprising:
    a processor configured to scan a volume of space for one or more targets in the volume of space using electromagnetic energy data,
    wherein
    the processor is configured to receive transportation route data and to use traffic data along the ground transportation route to remove one or more ground targets traveling along a ground transportation route of the transportation route data.

9. The sensing system of claim 8, wherein the processor is configured to use altitude data for the targets traveling along the ground transportation route to remove the one or more ground targets traveling along the ground transportation route of the transportation route data.

10. The sensing system of claim 8, wherein the traffic data includes real time traffic data along the ground transportation route of the transportation route data.

11. The sensing system of claim 8, wherein the processor is configured to provide the one or more targets without the one or more removed ground targets to detect and avoid system, the electromagnetic energy data is radar data, and the sensing system is configured for use with an aircraft.

* * * * *